(12) United States Patent
Saieg et al.

(10) Patent No.: US 9,102,206 B1
(45) Date of Patent: Aug. 11, 2015

(54) AXLE SUSPENSION SYSTEM

(71) Applicant: ArvinMeritor Technology, LLC, Troy, MI (US)

(72) Inventors: Steven George Saieg, Rochester Hills, MI (US); Craig Allen Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/221,992

(22) Filed: Mar. 21, 2014

(51) Int. Cl.
*B60G 9/02* (2006.01)
*B60G 9/00* (2006.01)
*B60G 11/27* (2006.01)
*F16D 65/28* (2006.01)

(52) U.S. Cl.
CPC ............... *B60G 9/003* (2013.01); *B60G 11/27* (2013.01); *F16D 65/28* (2013.01)

(58) Field of Classification Search
CPC ................... B60G 2200/31; B60G 2204/4306; B60G 2206/10
USPC ...................... 280/124.11, 124.116, 124.117, 280/124.128, 124.153, 124.157
See application file for complete search history.

(56) References Cited

U.S. PATENT DOCUMENTS

| | | | |
|---|---|---|---|
| 6,241,266 B1 | 6/2001 | Smith et al. | |
| 6,416,069 B1 * | 7/2002 | Ramsey | 280/124.116 |
| 7,048,288 B2 * | 5/2006 | Chan et al. | 280/124.116 |
| 7,360,774 B2 * | 4/2008 | Saieg et al. | 280/124.128 |
| 7,484,744 B2 * | 2/2009 | Galazin et al. | 280/124.116 |
| 8,006,987 B2 * | 8/2011 | Saieg et al. | 280/124.116 |
| 8,333,396 B2 | 12/2012 | Saieg et al. | |
| 8,678,407 B2 * | 3/2014 | Eveley | 280/124.116 |
| 8,844,955 B2 * | 9/2014 | Fulton et al. | 280/124.116 |
| 8,919,793 B1 | 12/2014 | Klein et al. | |
| 2002/0135151 A1 * | 9/2002 | Schlosser et al. | 280/124.128 |
| 2006/0163834 A1 * | 7/2006 | Brereton et al. | 280/124.128 |
| 2006/0237939 A1 * | 10/2006 | Hicks | 280/124.116 |
| 2007/0145705 A1 * | 6/2007 | Ramsey et al. | 280/124.128 |
| 2011/0089660 A1 | 4/2011 | Dodd et al. | |
| 2011/0163514 A1 * | 7/2011 | Saieg et al. | 280/124.116 |
| 2013/0033019 A1 * | 2/2013 | Power et al. | 280/124.128 |
| 2013/0154224 A1 | 6/2013 | Wakefield et al. | |

FOREIGN PATENT DOCUMENTS

| | | | |
|---|---|---|---|
| EP | 2604452 A2 | 6/2013 | |
| WO | 0046052 A1 | 8/2000 | |

OTHER PUBLICATIONS

German Patent Office, Office Action for the corresponding German Patent Application No. DE 10 2015 100 782.7 mailed Feb. 19, 2015.

* cited by examiner

*Primary Examiner* — Paul N Dickson
*Assistant Examiner* — Robert A Coker
(74) *Attorney, Agent, or Firm* — Brooks Kushman P.C.

(57) ABSTRACT

An axle suspension system for a vehicle. The axle suspension system may have a cam bracket that may be disposed on an exterior surface of an axle. The cam bracket may extend through a weld window of an axle wrap.

20 Claims, 3 Drawing Sheets

AXLE SUSPENSION SYSTEM

TECHNICAL FIELD

This patent application relates to an axle suspension system that may be provided with a vehicle.

BACKGROUND

A trailing arm suspension with a wrapper compression axle mounting is disclosed in U.S. Pat. No. 6,241,266.

SUMMARY

In at least one embodiment, an axle suspension system is provided. The axle suspension system may include an axle having an exterior surface, an axle wrap that may engage the exterior surface, a trailing arm, and a cam bracket. The axle wrap may include a weld window that may extend through and may be completely defined within the axle wrap. The trailing arm may be mounted to the axle wrap. The cam bracket may be disposed on the exterior surface of the axle and may extend through the weld window.

In at least one embodiment, an axle suspension system is provided. The axle suspension system may include an axle, an axle wrap and a cam bracket. The axle may have an exterior surface. The axle wrap may engage the exterior surface and may define a weld window. The cam bracket may engage the exterior surface and may extend through and may be completely spaced apart from the weld window. The cam bracket may receive a cam shaft that may actuate a brake system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
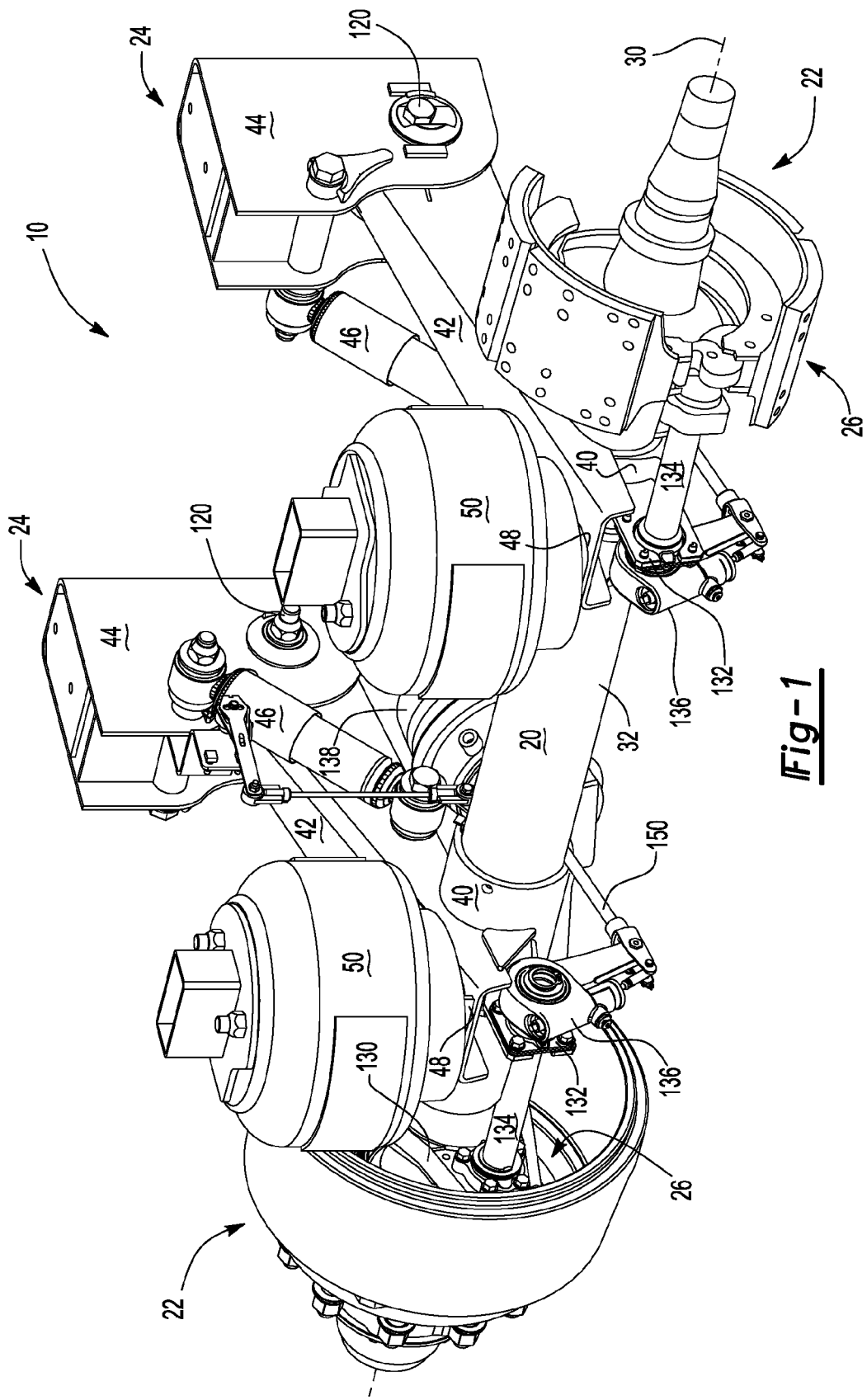
FIG. 1 is a perspective view of an exemplary axle suspension system.

Referring to FIG. 1, an exemplary axle suspension system 10 is shown. The axle suspension system 10 may be provided with a vehicle, such as a trailer that may be provided with a motor vehicle. The axle suspension system 10 may include an axle 20, at least one wheel hub assembly 22, at least one trailing arm assembly 24, and a brake subsystem 26.

The axle 20 may extend along an axis 30 and may have an exterior surface 32. The exterior surface 32 may be an exterior circumference of the axle 20.

One or more wheel hub assemblies 22 may be rotatably disposed on the axle 20. A wheel hub assembly 22 may be provided at each end of the axle 20. Each wheel hub assembly 22 may be configured to receive a wheel upon which a tire may be mounted. In FIG. 1, the wheel hub assembly 22 located at the right end of the axle 20 is shown with a wheel removed to more clearly show a portion of the brake subsystem 26.

One or more trailing arm assemblies 24, which may also be referred to as trailing suspension arms, may be mounted on the axle 20. In the embodiment shown, two trailing arm assemblies 24 are provided that are spaced apart from each other. Each trailing arm assembly 24 may include an axle wrap 40, a trailing arm 42, a hanger 44, a shock absorber 46, a pedestal mount 48, and an air spring 50.

Figure 2:
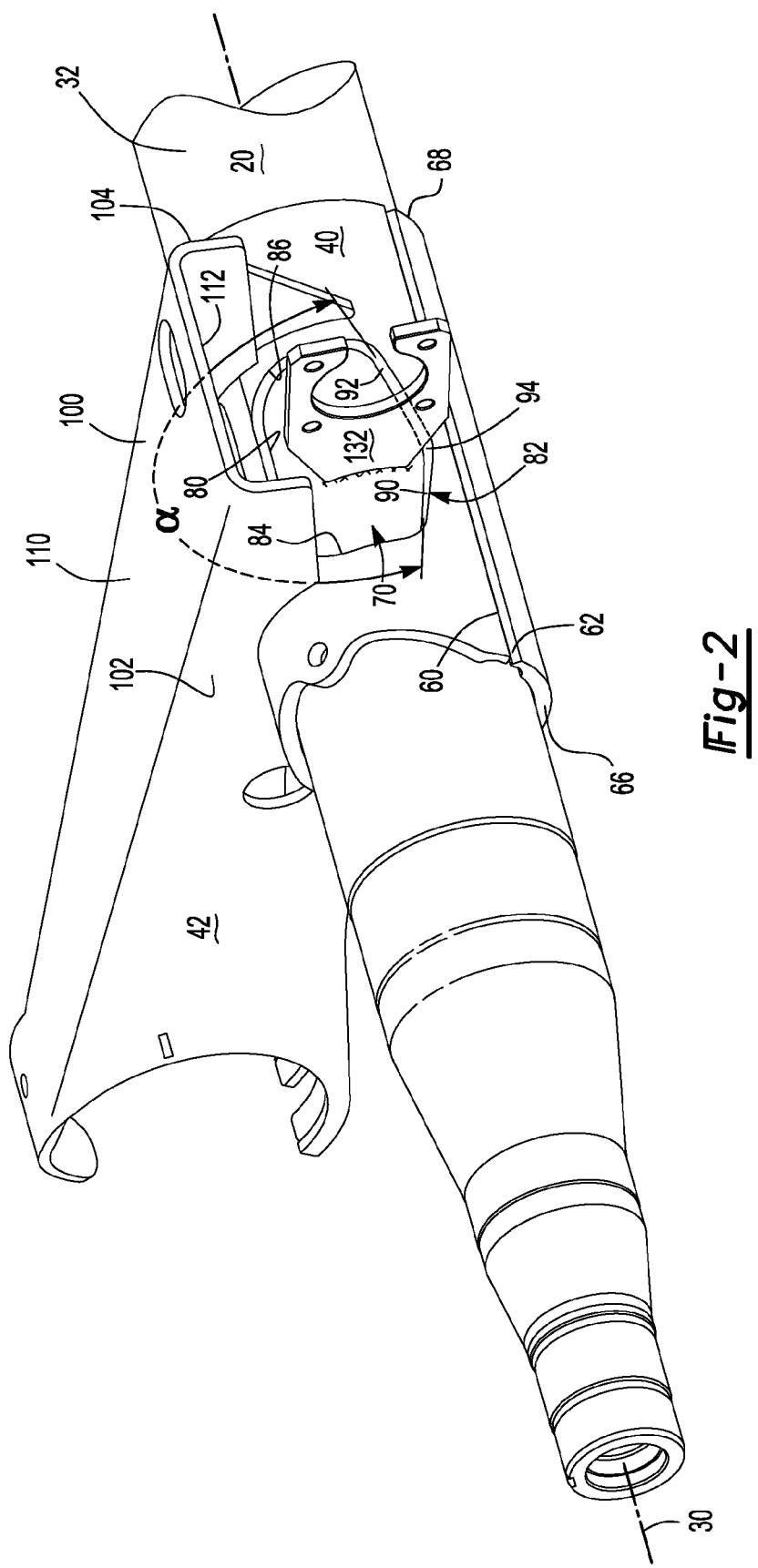
FIGS. 2 and 3 are perspective views of a portion of the axle suspension system of FIG. 1.
Figure 3:
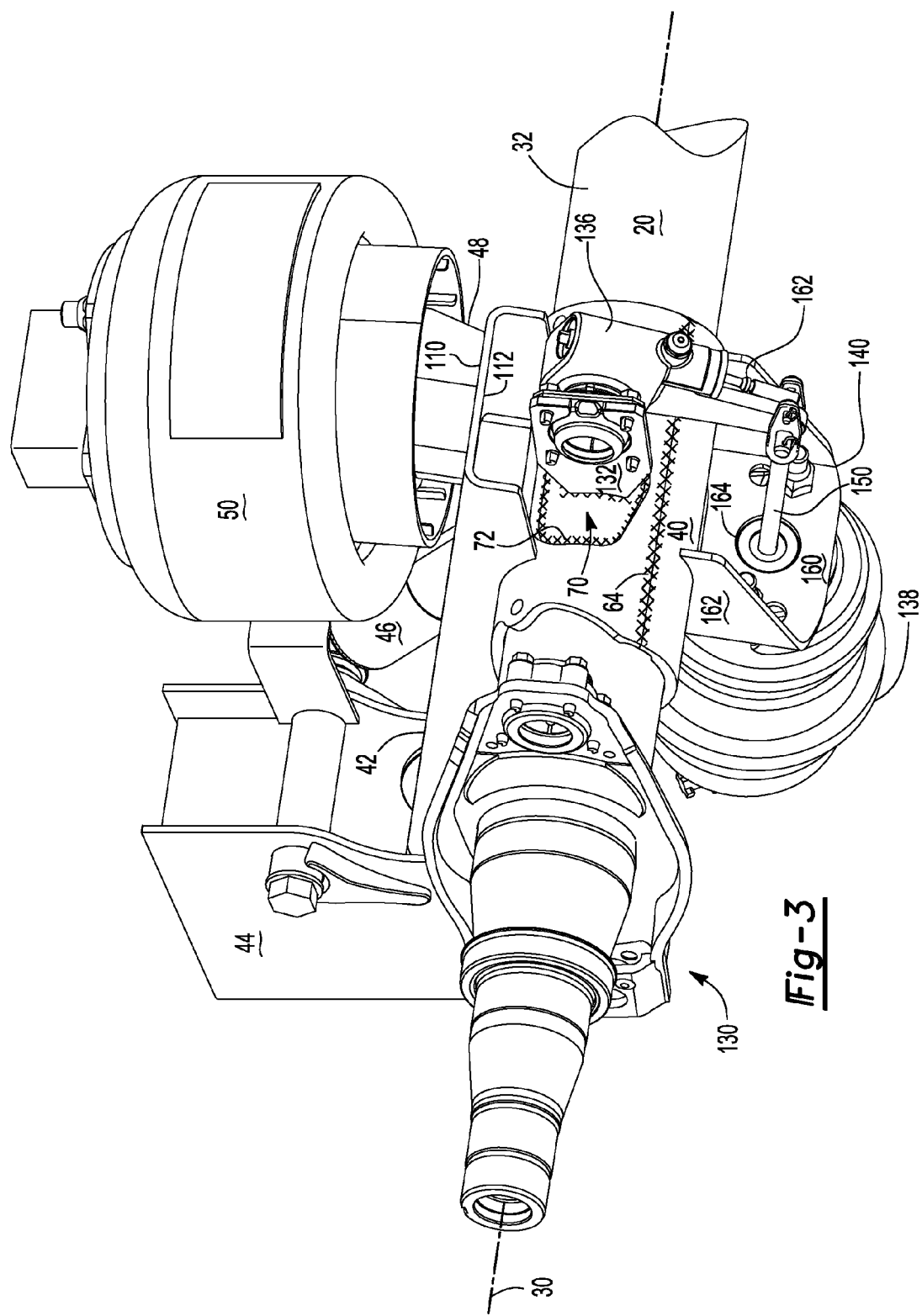

Referring to FIGS. 1-3. the axle wrap 40 may be fixedly disposed with respect to the axle 20. The axle wrap 40 may be positioned between the trailing arm 42 and the axle 20 and may facilitate mounting of the trailing arm 42 to the axle 20.

The axle wrap 40 may engage and may extend at least partially around the exterior surface 32 or circumference of the axle 20. For example, the axle wrap 40 may extend completely around the exterior surface 32 of the axle 20 or may extend partially around the exterior surface 32 of the axle 20, such as more than halfway or more than 180° around the exterior surface 32 of the axle 20. In the embodiment shown in FIG. 2, the axle wrap 40 extends almost entirely around the axle 20 and includes a first end surface 60 that is spaced apart from a second end surface 62 that is disposed opposite the first end surface 60. A weld seam 64, which is shown in FIG. 3 and omitted in FIGS. 1 and 2, may be provided between the first end surface 60 and the second end surface 62 to help attach the axle wrap 40 to the axle 20 in one or more embodiments. The first and second end surfaces 60, 62 and the weld seam 64 may be positioned below the axis 30 and below the trailing arm 42 in one or more embodiments to help facilitate assembly.

The axle wrap 40 may also include a first side 66 and a second side 68. The first side 66 may face toward the wheel hub assembly 22. The second side 68 may be disposed opposite the first side 66. The trailing arm 42 may be disposed between and may be spaced apart from the first side 66 and the second side 68.

The axle wrap 40 may include at least one weld window 70 that may be configured as a through hole that may extend through the axle wrap 40. The weld window 70 may be completely defined by or bounded within the axle wrap 40 and may be disposed between and may be spaced apart from the first and second end surfaces 60, 62 and the first and second sides 66, 68. In addition, the weld window 70 may be disposed between and may be spaced apart from the weld seam 64 and the trailing arm 42.

As shown in FIG. 3, the weld window 70 may be configured to receive a weld 72 that may extend completely around the weld window 70 to join the axle wrap 40 to the exterior surface 32 of the axle 20. The weld window 70 may have any suitable configuration. In FIG. 2, the weld window 70 is shown without the weld 72 and has a generally five sided configuration that may include an upper side 80, a lower side 82, a first lateral side 84, and a second lateral side 86.

The upper side 80 may be disposed proximate the trailing arm 42. The lower side 82 may be disposed opposite the upper side 80 and may be disposed between the upper side 80 and the first end surface 60. The lower side 82 may have a first segment 90 and a second segment 92. The first segment 90 and the second segment 92 may intersect at an intersection point 94 and may extend at an angle α with respect to each other. The angle α may be an obtuse angle and may be configured such that the first segment 90 and the second segment 92 extend generally in opposite directions and generally upward or away from the first end surface 60. The first segment 90 may extend from the intersection point 94 to the first lateral side 84. The second segment 92 may extend from the intersection point 94 to the second lateral side 86. The first lateral side 84 may extend from the first segment 90 to the upper side 80. The second lateral side 86 may extend from the second segment 92 to the upper side 80. The first lateral side 84 may be disposed generally parallel to the second lateral side 86 in one or more embodiments. Such a weld window configuration may be configured to help reduce stresses or stress points when the axle wrap 40 is welded to the axle 20.

Referring to FIGS. 1 and 2, the trailing arm 42 may be fixedly disposed on the axle wrap 40. As such, the trailing arm 42 may be spaced apart from and may not engage the axle 20. The trailing arm 42 may include an upper wall 100, a first side wall 102, and a second side wall 104. The upper wall 100 may have an upper surface 110 and a lower surface 112 that may be disposed opposite the upper surface 110. The upper wall 100 may be spaced apart from the axle wrap 40 in one or more embodiments. The first side wall 102 and the second side wall 104 may be spaced apart from each other and may extend from opposite ends of the upper wall 100 to the axle wrap 40. In addition, the first side wall 102 and the second side wall 104 may be substantially perpendicular with respect to the upper wall 100 in one or more embodiments. The first side wall 102 and the second side wall 104 may be welded to an exterior surface of the axle wrap 40 and may be spaced apart from the weld window 70.

Referring to FIG. 1, the hanger 44 may be pivotally disposed at a first end of the trailing arm 42. The hanger 44 may be configured to be mounted to a support frame or chassis of the vehicle. The hanger 44 may receive a pivot bolt 120 that may extend through the hanger 44 and a bushing (not shown) disposed within the trailing arm 42 and on the pivot bolt 120. As such, the trailing arm 42 may pivot about the bushing (not shown) and pivot with respect to the hanger 44.

The shock absorber 46 may be provided to dampen shock impulses and dissipate kinetic energy. The shock absorber 46 may be mounted to the hanger 44 at a first end and to the trailing arm 42 at a second end.

The pedestal mount 48 may be disposed proximate a second end of the trailing arm 42 that may be disposed opposite the hanger 44. The pedestal mount 48 may be fixedly disposed on the upper surface 110 of the upper wall 100 and may be configured to support the air spring 50.

The air spring 50 may be disposed proximate and may be fixedly disposed on the pedestal mount 48. The air spring 50 may also be mounted to the support frame or chassis of the vehicle. The air spring 50 may receive compressed air and may be provided to absorb shocks and vibrations to improve ride quality. In addition, the air spring 50 may provide self-leveling functionality.

The brake subsystem 26 may be provided to brake or inhibit rotation of an associated wheel hub assembly 22. The brake subsystem 26 may be mounted to the axle 20 and may be spaced apart from a corresponding trailing arm 42. In at least one embodiment, the brake subsystem 26 may be configured with a friction brake configured as a drum brake assembly. The brake subsystem 26 may include a brake spider 130, a cam bracket 132, a cam shaft 134, a slack adjuster 136, an actuator 138, and an actuator bracket 140.

The brake spider 130 may facilitate mounting of the drum brake assembly to the axle 20. The brake spider 130 may be disposed between a wheel hub assembly 22 and the axle wrap 40 of a corresponding trailing arm assembly 24. As is best shown in FIG. 1, the brake spider 130 may have a hole through which the cam shaft 134 may extend.

The cam bracket 132 may be spaced apart from the brake spider 130 and may rotatably support the cam shaft 134. In at least one embodiment, the cam shaft 134 may extend substantially parallel to the axis 30 of the axle 20. For example, the cam bracket 132 may include a hole through which the cam shaft 134 may extend. As is best shown in FIGS. 2 and 3, the cam bracket 132 may extend through the weld window 70 and may be completely spaced apart from the axle wrap 40 and weld 72. The cam bracket 132 may be disposed substantially perpendicular to the upper side 80 of the weld window 70 in one or more embodiments. In addition, the cam bracket 132 may extend substantially perpendicular to the axis 30 of the axle 20. The cam bracket 132 may be fixedly disposed on the exterior surface 32 of the axle 20 in any suitable manner. For example, the cam bracket 132 may be directly welded to the exterior surface 32 of the axle 20 proximate a neutral axis of axle 20 to reduce stress forces on the cam bracket 132 or associated welds to help improve durability. The cam bracket 132 may be spaced apart from the trailing arm 42. For example, the cam bracket 132 may be disposed directly below the trailing arm 42 and the air spring 50 as is best shown in FIG. 1. As such, the lower surface 112 may face toward and may be spaced apart from the cam bracket 132. In addition, the cam bracket 132 may be disposed directly opposite a portion of the trailing arm assembly 24, such as the trailing arm 42 and/or hanger 44.

The slack adjuster 136, which is best shown in FIG. 1, may be provided to compensate for brake wear. The slack adjuster 136 may be fixedly disposed near an end of the cam shaft 134 that may be disposed proximate the actuator 138. For example, the slack adjuster 136 may have a center bore that may receive the cam shaft 134. The center bore of the slack adjuster 136 and the cam shaft 134 may have mating splines that couple the slack adjuster 136 and a cam shaft 134 together.

The actuator 138 may be provided to actuate the cam shaft 134. The actuator 138 may be mounted to the axle 20 via the actuator bracket 140. The actuator 138 may be of any suitable type, such as a pneumatic actuator. The actuator 138 may include an actuator shaft 150 that may extend to the slack adjuster 136. The actuator 138 may move between a retracted position and an extended position. In the retracted position, the cam shaft 134 may be positioned such that the brake subsystem 26 does not inhibit rotation of an associated wheel hub assembly 22. In the extended position, the cam shaft 134 may be rotated such that the brake subsystem 26 inhibits rotation of an associated wheel hub assembly 22.

The actuator bracket 140, which is best shown in FIG. 3, may facilitate mounting of the actuator 138. The actuator bracket 140 may be fixedly disposed on the axle wrap 40. In addition, the actuator bracket 140 may be spaced apart from the cam bracket 132. The actuator bracket 140 may be provided in various configurations. In at least one embodiment, the actuator bracket 140 may have a one-piece configuration that may include a first wall 160 that may be disposed between a pair of side walls 162. The first wall 160 may be spaced apart from the axle wrap 40 in one or more embodiments. The side walls 162 may extend from opposing edges of the first wall 160 and away from the actuator 138. Ends of each side wall 162 that are disposed adjacent to the axle wrap 40 may be fixedly attached to the axle wrap 40, such as by welding, in one or more embodiments.

The actuator 138 may be mounted to the first wall 160 in any suitable manner. For example, the first wall 160 may include one or more mounting holes that receive a fastener or a portion of the actuator 138 to position the actuator 138 with respect to the actuator bracket 140. In addition, the first wall 160 may include an actuator shaft hole 164. The actuator shaft 150 may extend from the actuator 138 through the actuator shaft hole 164 to the slack adjuster 136.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle suspension system comprising:
an axle having an exterior surface;
an axle wrap that engages the exterior surface, the axle wrap having a weld window that extends through and is completely defined within the axle wrap; and
a cam bracket that is disposed on the exterior surface and extends through the weld window.

2. The axle suspension system of claim 1 wherein the cam bracket is spaced apart from the axle wrap.

3. The axle suspension system of claim 1 further comprises a trailing arm that is mounted to the axle wrap, wherein the trailing arm is spaced apart from the cam bracket.

4. The axle suspension system of claim 3 wherein the cam bracket is disposed directly opposite the trailing arm.

5. The axle suspension system of claim 3 wherein the cam bracket is disposed below the trailing arm.

6. The axle suspension system of claim 3 wherein an air spring is disposed proximate an end of the trailing arm and wherein the cam bracket is disposed under the trailing arm and the air spring.

7. The axle suspension system of claim 1 wherein the exterior surface is a circumference of the axle and the axle wrap extends around the circumference.

8. The axle suspension system of claim 1 wherein the exterior surface is a circumference of the axle and the axle wrap extends partially around the circumference such that the axle wrap has a first end surface and a second end surface that are spaced apart and disposed opposite each other.

9. The axle suspension system of claim 8 further comprising a weld seam that extends from the first end surface to the second end surface, wherein the weld window is spaced apart from the weld seam.

10. The axle suspension system of claim 9 wherein the weld window is disposed between and spaced apart from the weld seam and a trailing arm that is mounted to the axle wrap.

11. An axle suspension system comprising:
an axle having an exterior surface;
an axle wrap that engages the exterior surface and that defines a weld window, wherein the axle wrap extends around more than half of the exterior surface; and
a cam bracket that receives a cam shaft that actuates a brake subsystem, wherein the cam bracket engages the exterior surface and extends through and is completely spaced apart from the weld window.

12. The axle suspension system of claim 11 further comprises a trailing arm that engages the axle wrap.

13. The axle suspension system of claim 12 wherein the trailing arm is spaced apart from the axle.

14. The axle suspension system of claim 12 wherein the trailing arm includes an upper surface and a lower surface disposed opposite the upper surface, wherein an air spring is disposed proximate the upper surface and the lower surface faces toward and is spaced apart from the cam bracket.

15. The axle suspension system of claim 12 wherein the axle wrap includes a first side and a second side disposed opposite the first side, wherein the trailing arm is spaced apart from and disposed between the first side and the second side.

16. The axle suspension system of claim 15 wherein the weld window is disposed between the first side and the trailing arm.

17. The axle suspension system of claim 16 wherein the trailing arm includes a first side wall and a second side wall disposed opposite the first side wall, wherein the weld window is disposed between the first side wall and the second side wall.

18. The axle suspension system of claim 11 further comprises an actuator bracket that receives an actuator that is configured to actuate the cam shaft, wherein the actuator bracket engages the exterior surface.

19. The axle suspension system of claim 11 wherein the weld window includes an upper side and a lower side having a first segment and a second segment, wherein the first and second segments extend in opposite directions from an intersection point and at an angle with respect to each other, wherein the cam bracket is disposed substantially perpendicular to the upper side.

20. The axle suspension system of claim 19 further comprising a first lateral side that extends from the first segment to the upper side and a second lateral side that extends from the second segment to the upper side, wherein the first and second lateral sides are spaced apart and disposed substantially parallel to each other.

* * * * *